United States Patent
Lallukka et al.

(10) Patent No.: US 6,347,138 B1
(45) Date of Patent: Feb. 12, 2002

(54) PROCEDURE FOR ENSURING THE ACTIVATION OF A V5 INTERFACE

(75) Inventors: Toivo Lallukka, Oulu; Arto Rukajärvi, Oulunsalo, both of (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/310,611

(22) Filed: May 12, 1999

Related U.S. Application Data

(63) Continuation of application No. PCT/FI98/00115, filed on Feb. 10, 1998.

(30) Foreign Application Priority Data

Feb. 28, 1997 (FI) .................................................. 970890

(51) Int. Cl.⁷ .............................................. H04M 7/00
(52) U.S. Cl. .................. 379/220.01; 379/279; 370/217
(58) Field of Search ........................... 379/220.01, 219, 379/221.01–221.15, 279, 229; 370/242, 228, 522, 217

(56) References Cited

U.S. PATENT DOCUMENTS

| | | | | |
|---|---|---|---|---|
| 5,537,468 A | * | 7/1996 | Hartmann | 379/221.01 |
| 5,751,574 A | * | 5/1998 | Loebig | 700/82 |
| 5,920,569 A | * | 7/1999 | Leobig | 370/424 |
| 6,278,688 B1 | * | 8/2001 | Suutari et al. | 370/217 |

FOREIGN PATENT DOCUMENTS

EP 0 763 953 3/1997

OTHER PUBLICATIONS

A. Gillespie "Interfacing Access Networks to Exchanges: The ETSI V5 Approach" *IEEE Global Telecommunications Conference*, vol. 3, pp. 1754–1758.
K Khakzar "V5 Interfaces between Digital Local Exchanges and Access Networks" *Frequenz*, Vol. 48, pp. 44–50.
International Search Report for PCT/FI98/00115.

* cited by examiner

*Primary Examiner*—Ahmad Matar
*Assistant Examiner*—Benny Q. Tieu
(74) *Attorney, Agent, or Firm*—Altera Law Group, LLC

(57) ABSTRACT

The present invention relates to a procedure for ensuring the activation of a V5 interface formed between a local exchange and an access node. According to the invention, the checking of the operational condition of the primary and secondary links is started simultaneously both on the local exchange side and on the access node side, and if a confirmation indicating that the link is operational is received for the secondary link first, then a switchover of the primary link to the secondary link according to the V5 definitions is performed and the new primary link is used for protection in the V5 interface during the V5 interface activation process. The invention makes it possible to avoid unnecessary interruptions of activation during the V5 interface activation procedure.

8 Claims, 4 Drawing Sheets

PROCEDURE FOR ENSURING THE ACTIVATION OF A V5 INTERFACE

Figure 1A:
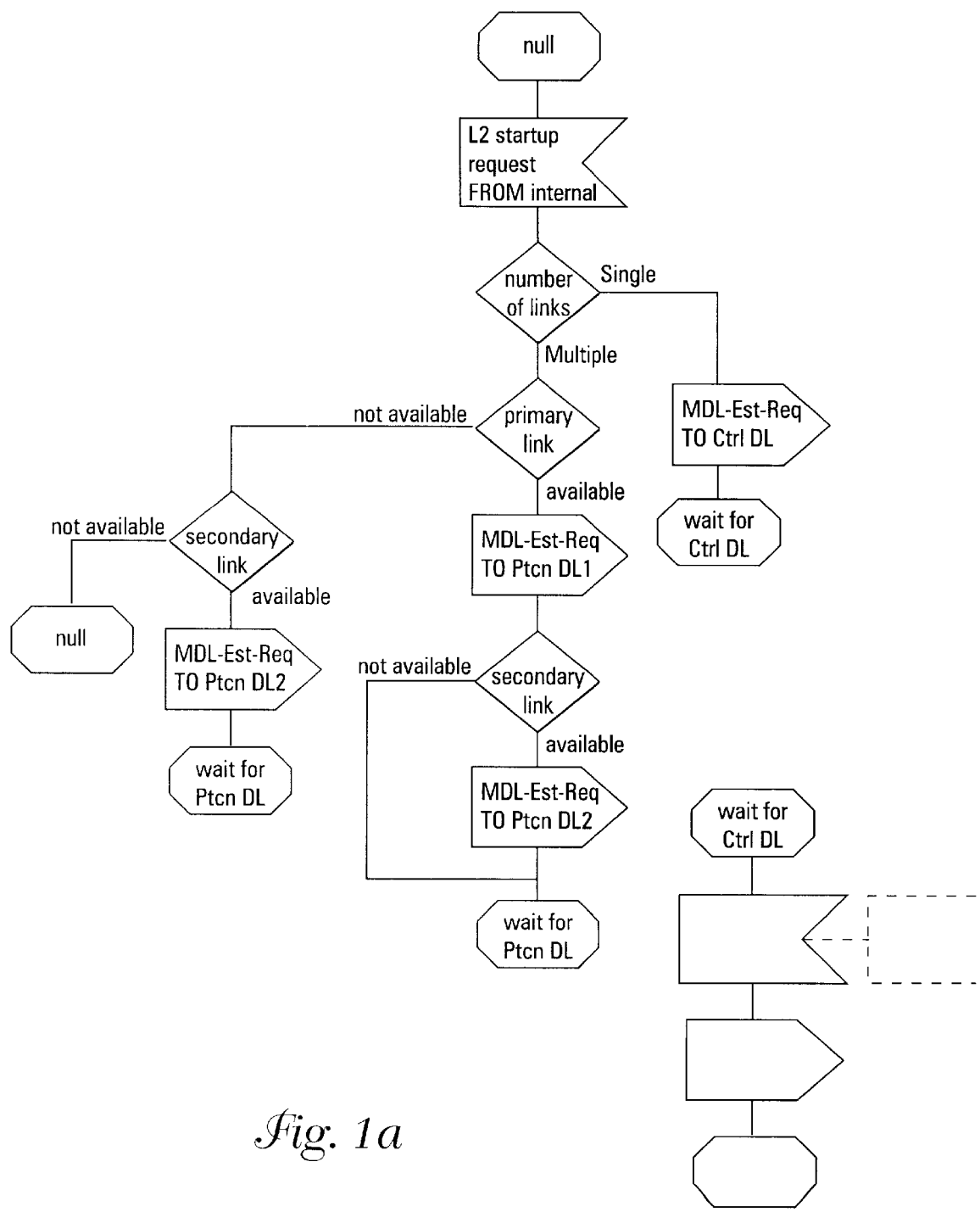

"This application is a continuation of international application number PCT/FI98/00115, filed Feb. 10, 1998, pending."

The present invention relates to a procedure as defined in the preamble of claim 1 for ensuring the activation of a V5 interface formed between a local exchange and an access node.

Open interfaces (V5.1 and V5.2) between a local exchange and a local network or an access node are defined in the ETSI (European Telecommunications and Standards Institute) standards of the ETS 300 324 and ETS 300 347 series. V5 interfaces enable subscribers belonging to a physically separate local network to be connected to a telephone exchange using a standard interface. In the present application, V5 interface specifically means a dynamic concentrator interface (V5.2) as defined by the standard series ETS 300 347, which consists of one or more (1–16) PCM (Pulse Code Modulation) lines. One PCM line comprises 32 channels or time slots, each of which with a transfer rate of 64 kbit/s, i.e. 2048 kbit/s in all. The V5.2 interface supports analogue telephones as used in the public telephone network, digital, such as ISDN (Integrated Services Digital Network) basic and system subscriber connections as well as other analogue or digital terminal equipment based on semi-fixed connections.

Certain time slots in the V5 interface, which form a channel called C-channel, serve to transmit the protocols used for controlling the interface itself and the calls transmitted over the interface. A C-channel is a 64 kbit/s time slot reserved for this purpose, and it serves to transmit information which may belong e.g. to the Control protocol, Link control protocol, Protection protocol or BCC protocol of the V5 interface, or which may consist of PSTN signalling or ISDN data. Further, according to the standards mentioned above, a C-channel can be reserved for time slots 16, 15 and/or 31 in the PCM line or V5 interface link. Especially in a V5 interface, the system automatically creates C-channels for the critical protocols (Control, Link control, BCC and Protection), whereas the operator can place the PSTN signalling as desired, either in the same channel as the critical protocols or in another C-channel. In addition, the operator may allocate a maximum of three signalling channels as so-called backup channels. These channels are resorted to in the case of a failure of the link to which the channels were originally allocated. In a V5 interface having more than one 2 Mbit/s links, a link whose physical C-channel in time slot 16 transmits the Control, Link control, BCC and Protection protocols is defined as the primary link. Further, a link whose physical C-channel in time slot 16 only transmits the Protection protocol is a secondary link.

In conjunction with the activation of a V5 interface, certain standard operations are performed to make sure that the LAPV5 protocol in both the access node and in the local exchange can ensure reliable transparent data transfer in the C-channel. The function of the LAPV5 protocol is to monitor the operation of the signalling channels, multiplex layer-3 signalling into the PCM frame structure and transmit ISDN data in an appropriate manner. In the V5 interface currently used, the system start-up procedure first checks the operation of the primary and secondary links. After this, the Protection protocol data link is activated, first for the primary link and then for the secondary link. However, the system does not take into account the conflicting situation that may arise when the local exchange and the access node receive different responses to the checking of the primary and secondary links, i.e. when one receives a "link ok" message and the other a "link failed" message. Such a situation may occur when e.g. the local exchange takes the primary link out of use (blocking) and a switchover of the primary link to the secondary link is performed. Further, the access node may for some reason be later reset, so the interface must be reactivated at the access node end. However, the reset caused the loss of the primary link blocking data previously obtained, so the access node will try to activate the interface as normal, assuming the primary link to be available. In this situation, the access node will not receive a confirmation about the primary link and remains in a locked state while waiting for a confirmation. On the other hand, a conflict may arise when the V5 interface recovers from a situation in which both the primary and secondary links are broken. In this situation, one of the parties may start signalling via the primary link while the other party starts signalling via the secondary link, depending on which one of the links becomes ready for operation first. Further, during the normal process for activating the V5 interface, a L2ACT procedure consistent with the above-mentioned standard starts the procedure for activating the Protection protocol data link in the normal manner and waits in a predetermined state for a confirmation regarding the primary link. The other party again may detect that the primary link is out of order and try to establish a Protection protocol channel directly in the secondary link. The data link activation procedure remains waiting for a confirmation for the use of the secondary link in another predetermined state. The result is a locked situation where neither party can get a confirmation and the V5 interface cannot be activated.

The last stage in the V5 interface layer 2 activation process is the activation of a PSTN data link. If the PSTN protocol has been configured to use e.g. the C-channel in time slot 15 of the primary link and the primary link is not operational during the sequence, the result is again a locked situation. If the link to which the PSTN data had been configured is out of order, then L2ACT will receive a "release link" message and the activation procedure is halted.

The object of the present invention is to eliminate the problems described above. A specific object of the present invention is to disclose a procedure that makes it possible to avoid the locked situations described above.

A further object of the present invention is to disclose a procedure for ensuring successful activation of a V5 interface in certain failure situations in which the failure does not necessarily require an interruption of the activation of the V5 interface.

As for the features characteristic of the invention, reference is made to the claims.

In the procedure of the invention for ensuring the activation of a V5 interface, preferably a V5.2 interface, formed between a local exchange and an access node and comprising at least two links formed via a PCM line, the operational condition of the links reserved for protocols essential to the operation of the interface as well as the operational condition of the primary and secondary links reserved for protocols used to back them up is checked during the process for activating the interface. To do this in practice, a certain programme block or equivalent on the local exchange side and on the access node side checks the operational condition of the link from its own side; in other words, in the access node a check is carried out to establish whether the connection from the access node to the link is in order, while in the local exchange a corresponding check is carried out. Once it has been ascertained that the link reserved or allocated for the protocol is operational, the protocol can be activated in accordance with a predetermined composition (V5 interface Provision).

According to the invention, the verification of the operational condition of the primary and secondary links is started simultaneously both on the local exchange side and on the access node side. After this, both the local exchange and the access node wait for a confirmation from the other party that the primary and/or secondary links/link are/is operational. If the first confirmation received indicates that the secondary link is operational, then in this case a switchover of the primary link to the secondary link is performed according to the above-mentioned V5 definitions and the new primary link is used for protection in the V5 interface during the V5 interface start-up process.

As compared with prior art, the present invention has the advantage that it makes it possible to avoid the locked situations during the V5 interface start-up process that may occur according to current definitions. Moreover, the present invention makes it possible to ensure that the V5 interface start-up process will continue even if one of the links in the V5 interface should be out of order or fail during the process. A further advantage of the invention worth mentioning is that, in a V5 interface operated in accordance with the invention, there is a provision for the possibility that something goes wrong during the start-up process.

In an embodiment of the present invention, if the switchover to the secondary link is unsuccessful, the activation process is halted in accordance with the V5 definitions. On the other hand, if the switchover is successful and the primary link is activated at a later stage of the process or during the switchover, then the primary link is configured as a new secondary link. According to the above-mentioned standards, the primary link obtained via the process described above can be used at a later stage of the activation process to back up the C-channel/channels so that a failure of the link in one of the channels will not result in an interruption of the activation process and a return to the initial state.

Next, the setup of a data link for the PSTN protocol is described as an example. The data links for other protocols essential to the operation of the V5 interface, such as the Control, Link control and BCC protocols, are set up and/or their setup is ensured in a corresponding manner during the activation of the V5 interface. Further, preferably before the request for the activation of a data link for a protocol is transmitted, the link allocated for the data link in question is checked to determine whether it is operational. If the link for the PSTN protocol is not operational, then a switchover of the link reserved for the PSTN protocol is carried out by running the Protection protocol over the primary link and the PSTN protocol is only activated after the switchover. Further, in a preferred embodiment of the invention, even if the link carrying the PSTN protocol is operational, switchover of the link allocated for the PSTN protocol can be carried out using the Protection protocol if confirmation of the activation of the protocol is delayed.

In a preferred embodiment of the invention, when a "release link" command concerning the data link for the Protection protocol or some other protocol is received, the data link is immediately reactivated. In current solutions, the process returns to the initial state, which significantly retards the operation of the interface as it interrupts the activation process to no purpose, because in any case a corresponding data link activation procedure is carried out when the process is restarted from the initial state.

In the following, the invention will be described by the aid of embodiment examples by referring to the attached drawing, in which FIGS. 1a–1g present flow diagrams representing a preferred embodiment of the procedure of the invention.

As regards the figures, the following should be noted. The transmission and reception of messages as presented in the figures are applicable both at the local exchange end and at the access node end of a V5.2 interface. Further, the shapes of the boxes in the diagrams have certain meanings; an octagon means that the process is in a given state, e.g. waiting for the confirmation of a request made in the process, a pentagon with an inward-pointing angle on the right-hand edge means that a message is received, a pentagon with an outward-pointing angle resembling an arrow on the right-hand edge means that a message is transmitted, and a rhombus signifies that an inference or other function is performed.

Figure 1B:
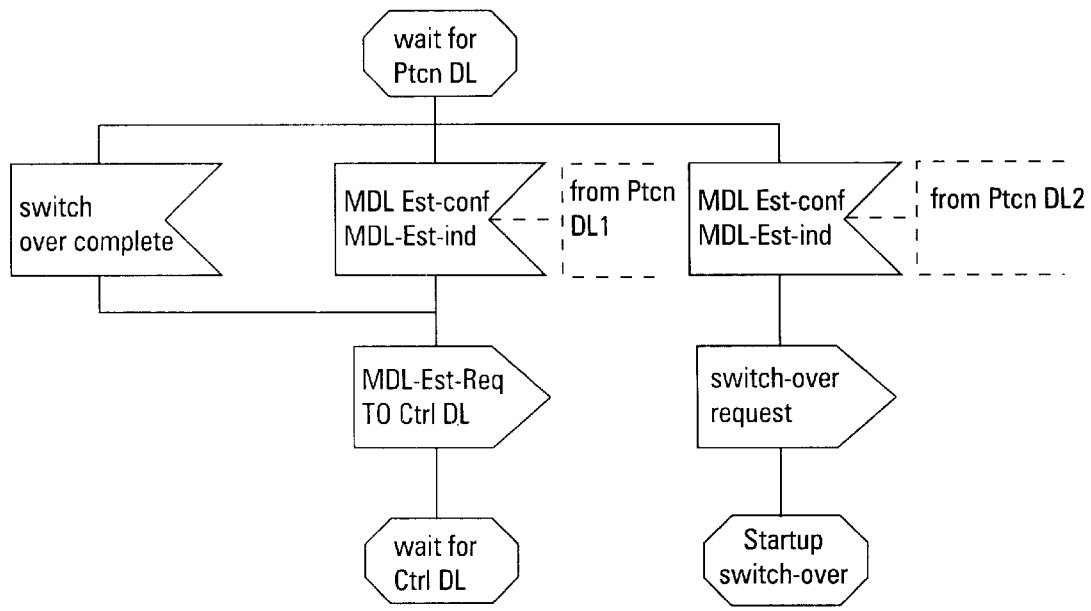
Figure 1C:
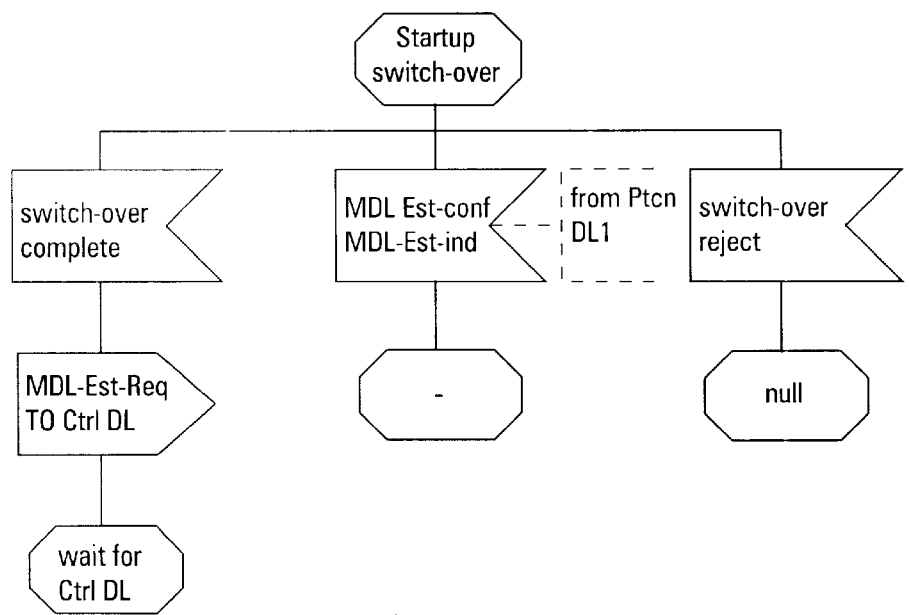

Starting from FIG. 1a, a request to start up the V5 interface is received. First, the number of links comprised in the interface is determined, and if there is only one link, then a data link setup request for the Control protocol data link is transmitted, whereupon the process continues as defined in the standards referred to above. If there are multiple links, first the availability of the primary link is checked and, regardless of whether that link is available or not, the process immediately continues by checking the availability of the secondary link. When a confirmation of the availability of the link is received, then a data link setup request for the Protection protocol is transmitted over both the primary and secondary links. After this, the process remains waiting until the Protection data link is set up. Referring to FIG. 1b, action continues from the octagon where the process is waiting for a confirmation of establishment of the Protection data link, and when a confirmation is received from data link 1 (message "from Ptcn DL1" shown in broken lines in FIG. 1b), the process then continues in the normal manner as defined in the above-mentioned standards. However, if a confirmation regarding the Protection data link is first received from data link 2 (secondary), then immediately a request for switchover of data link 1 (primary) is transmitted, whereupon an attempt is made to switch over the primary link to the secondary link. FIG. 1c illustrates the switchover carried out in conjunction with start-up. If a switchover confirmation message ("switchover complete") is received, then the process continues normally according to the above-described procedures, see FIG. 1c left-hand section. Further, a message indicating that the primary link, too, is operational may be received during the switchover procedure. In this case, the primary link is reconfigured as a secondary link. If the switchover is rejected, then the process returns to the initial state, FIG. 1c right-hand side.

Figure 1D:
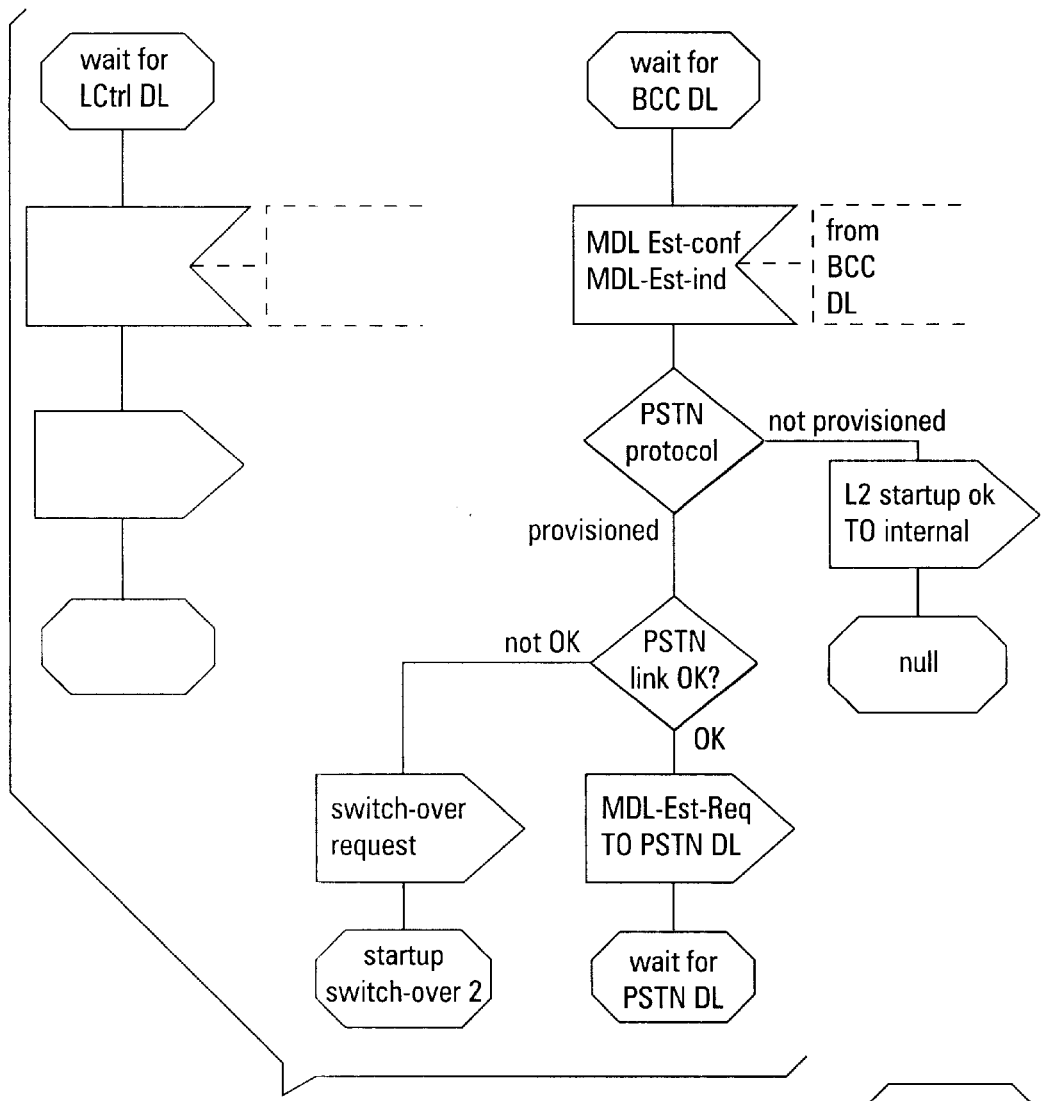

Referring to FIG. 1d, the activation of the PSTN protocol in a V5.2 interface in a preferred embodiment of the procedure of the invention will now be described in detail. After a confirmation of successful activation of the other protocols essential to the interface has been received, the activation of the PSTN protocol is performed last. At the beginning of the activation procedure, a check is carried out to establish whether a PSTN protocol has been configured for the interface. If the configuring has been done, then activation is continued by checking whether the PSTN data link is operational. If the link is not operational, then a link switchover request is transmitted and the process goes into a "start-up switchover 2" state. If the link is operational, then a link setup request is transmitted and the process remains aiting for a confirmation.

Figure 1E:
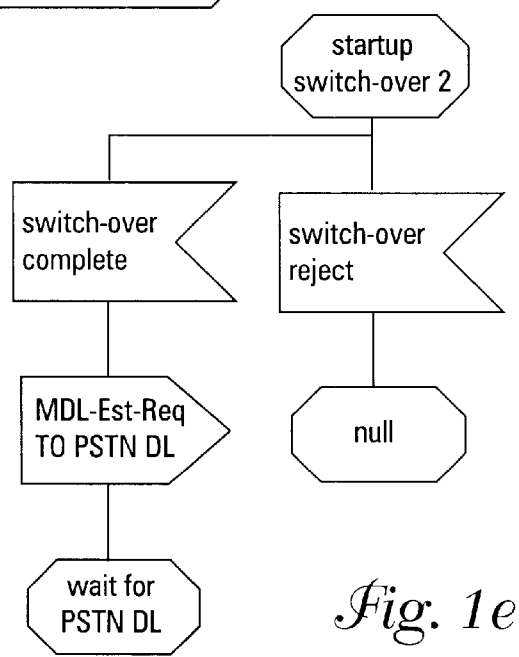
Figure 1F:
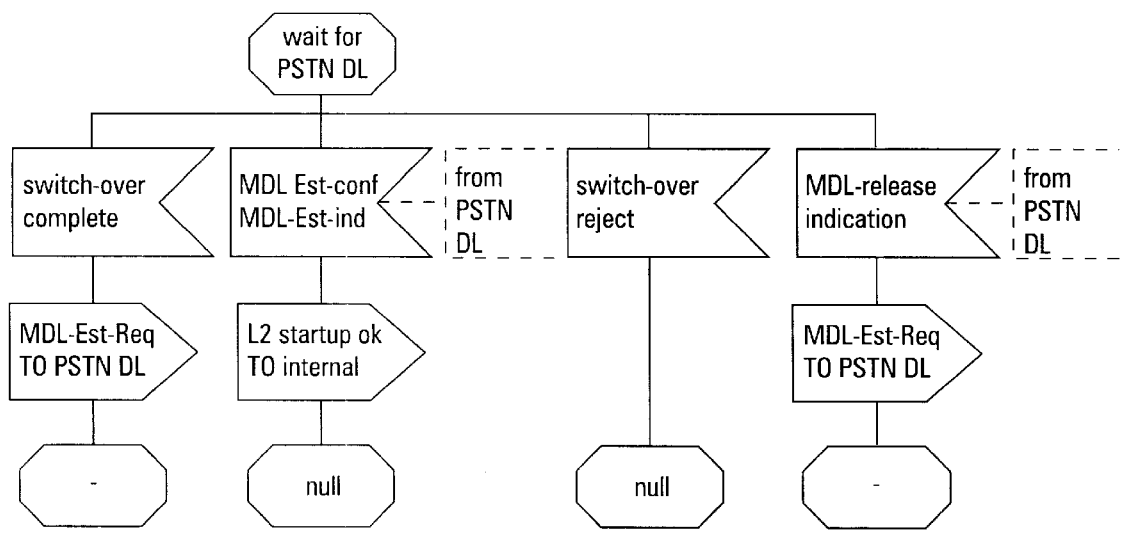
Figure 1G:
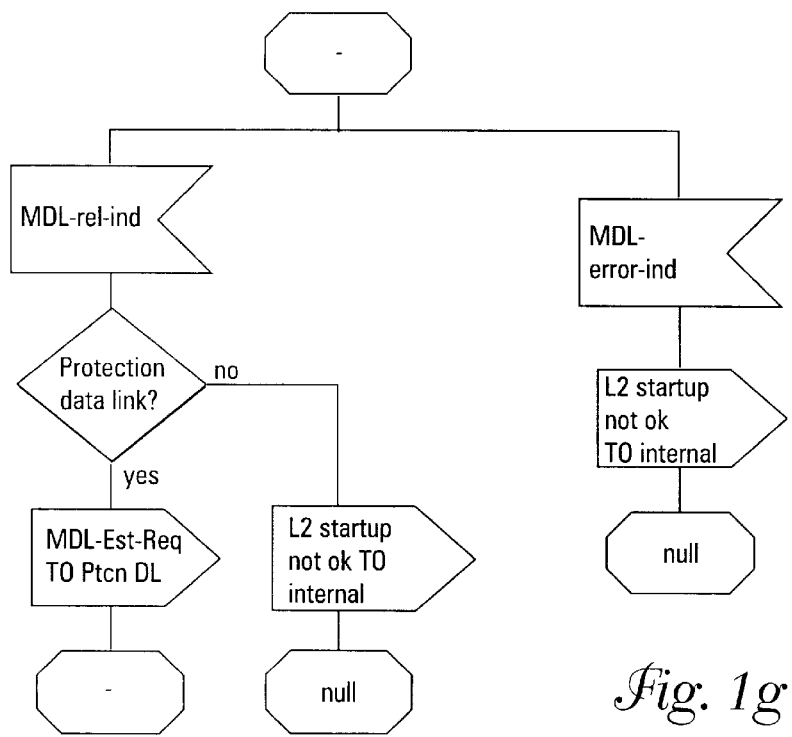

FIG. 1e shows the following stages when the process is waiting for a switchover of the PSTN link. If the switchover is successfully completed, then after this a PSTN data link setup request is transmitted over the new link and the process remains waiting for a confirmation. If the switchover is unsuccessful, then the process returns to the initial state and the interface activation procedure is terminated. FIG. 1f illustrates various situations that may arise while the process is waiting for the activation of the PSTN data link. First, if a message indicating successful activation of the link is received, then the process continues normally and a message is sent to indicate that the interface has been correctly activated. On the other hand, if a message indicating that the PSTN data link has been released, then a new request for the activation of the data link is transmitted. Let it be stated that, according to the invention, a corresponding activation request can be transmitted for all the essential protocols, such as the Protection or BCC protocols, during all stages of the interface start-up process. Further, referring to FIG. 1g, the operations carried out in the above-mentioned reactivation situation are described. When a message indicating the release of a data link is received, a check is carried out to determine whether there is a protection data link available for the data link concerned. If no link is available, then a message indicating that start-up was not properly carried out is transmitted and the process returns to the initial state. If a protection data link exists, then a data link activation request is transmitted over the protection data link. On the other hand, if an error message indicating that there is an error in the data link, which may be due to differences in configuration at the ends of the interface, then a message indicating that start-up was not properly carried out is transmitted and the process returns to the initial state.

The invention is not restricted to the examples of its embodiments described above, but many variations are possible within the scope of the inventive idea defined by the claims.

What is claimed is:

1. Procedure for ensuring the activation of a V5 interface formed between a local exchange (LE) and an access node (AN) and comprising at least two links (L), in which interface the operational condition of the links reserved for protocols essential to the operation of the interface as well as the operational condition of the primary and secondary links reserved for protocols used to protect them is checked during the activation procedure, characterised in that the checking of the operational condition of the primary and secondary links is started simultaneously both on the local exchange side and on the access node side;

the process waits for a confirmation that the primary and/or secondary links/link are/is operational; and if a confirmation indicating that the link is operational is received for the secondary link first, then a switchover of the primary link to the secondary link according to the V5 definitions is performed and the new primary link is used for protection in the V5 interface during the V5 interface activation process.

2. Procedure as defined in claim 1, characterised in that if the primary link switchover is unsuccessful, then the V5 interface activation process is terminated.

3. Procedure as defined in claim 1, characterised in that if the primary link becomes operational during the V5 interface activation process, then the primary link is defined as a new secondary link.

4. Procedure as defined in claim 1, characterised in that the C-channels of the V5 interface are protected during the activation process by the new primary link without returning to the initial state even if the link allocated for the PSTN protocol should be out of order.

5. Procedure as defined in claim 1, characterised in that, when the process is waiting for a confirmation of activation of the PSTN protocol, switchover of the link allocated for the PSTN protocol is carried out if the link fails.

6. Procedure as defined in claim 1, characterised in that if a standard "release link" command concerning the data link for the protection protocol is received, then the data link is immediately reactivated.

7. Procedure as defined in claim 1, characterised in that if a standard "release link" command concerning the data link for any protocol in the V5 interface is received, then the data link is immediately reactivated.

8. Procedure as defined in claim 1, characterised in that, before the activation of different protocols, such as the PSTN protocol, a check is carried out to establish whether the link allocated for the protocol in question is operational.

* * * * *